United States Patent [19]
Boutillier et al.

[11] 3,903,023
[45] Sept. 2, 1975

[54] PROCESS FOR THE PREPARATION OF STYRENE POLYMER FOAMS

[75] Inventors: Pierre Emile Boutillier, Colombes; Marcel Norbert Rozenbaum, Ville D'Avray, both of France

[73] Assignee: Societe Anonyme: Produits Chimiques Ugine Kuhlmann, Paris, France

[22] Filed: Aug. 29, 1972

[21] Appl. No.: 284,612

Related U.S. Application Data

[63] Continuation-in-part of Ser. No. 888,882, Dec. 29, 1969, abandoned.

[30] Foreign Application Priority Data

Dec. 30, 1968   France ............................ 68.182174

[52] U.S. Cl. ....... 260/2,5 HB; 260/2.5 E; 260/2.5 B; 260/874; 260/876 R; 260/898; 260/901; 264/54; 264/DIG. 14
[51] Int. Cl. ....................... C08f 47/10; C08f 33/02
[58] Field of Search ......... 260/2.5 B, 2.5 HB, 2.5 E, 260/874, 901, 876 R, 898

[56] References Cited
UNITED STATES PATENTS

| | | | |
|---|---|---|---|
| 2,864,802 | 12/1958 | Price et al. | 260/874 |
| 3,063,954 | 11/1962 | Galizia | 260/2.5 B |
| 3,425,966 | 2/1969 | Ronden et al. | 260/2.5 B |
| 3,435,018 | 3/1969 | Natta et al. | 260/93.5 R |
| 3,607,796 | 9/1971 | Eberle et al. | 260/2.5 HA |

*Primary Examiner*—Wilbert J. Briggs, Sr.
*Attorney, Agent, or Firm*—Brumbaugh, Graves, Donohue & Raymond

[57] ABSTRACT

Improved expandable styrene polymer thermoplastic compositions may be produced by combining a thermoplastic styrene polymer, a resinous styrene polymer having a high average molecular weight and a foaming agent. A method of extrusion employing such compositions is disclosed.

26 Claims, No Drawings

PROCESS FOR THE PREPARATION OF STYRENE POLYMER FOAMS

The present application is a continuation-in-part of our copending application Ser. No. 888,882, filed 12/29/69, and now abandoned, corresponding to French Patent Application Serial No. PV 182,174 dated Dec. 30, 1968.

The present invention relates to an improved process for foaming styrene polymers and the formation of cellular materials containing said polymers.

The term styrene polymers refers to homopolymers of unsubstituted or substituted vinyl aromatic hydrocarbon monomers as well as copolymers of said monomers between themselves and/or with other copolymerizable monomers as will be specified hereinafter.

It is known that by incorporating foaming agents in most thermoplastic materials it is possible, by heating, to convert the said materials into cellular products having densities in the range of 1 to 0.01 g/cm$^3$. Said low density cellular products are widely used, and more particularly in the manufacture of impact resistant packing material and in thermal insulation.

Various techniques permit foamable thermoplastic styrene polymer material to be converted into cellular structure finished products of various shapes, dimensions and properties. Among said techniques may be mentioned calendering, moulding, injection, extrusion, forming and the like.

More particularly, French Patent No. 1,498,620, French Patents of Additions Nos. 94,122 and 145,290, and French Patent No. 1,545,573 describe an extrusion process permitting profiled products to be obtained having a specific cross section with an inner cellular structure and a nonexpanded surface skin.

Other known techniques enable an expanded article to be obtained from a semi-product containing an agent capable of causing expansion at the desired moment. It is possible for instance, to mold such an article and then cause it to expand by raising it to a higher temperature than the decomposition or volatilization temperature of the foaming agent. A calendered slab containing such a foaming agent can thus be obtained and expanded when thermoforming is effected. In spite of the considerable success of said processes, none of them now appears to be completely satisfactory, as the foamable styrene polymer compositions available do not possess the combination of exact physical characteristics required by the techniques used.

It has already been suggested to carry out polymerization of the styrene monomer under special conditions (U.S. Pat. No. 3,425,968) in order to confer more desirable physical properties on the polymer, but said conditions require delicate and complex modes of operation which have an unfavorable effect on the cost of the product. Current practice thus consists in admixing with the polymer another substance, whether polymeric or non-polymeric, adapted to modify its properties. In most cases, lower viscosity is sought, but this is obtained to the detriment of other physical or mechanical properties of the finished article. In this connection, U.S. Pat. No. 2,864,802 may be mentioned, which lowers the viscosity of a polystyrene by the addition of another polystyrene of lower molecular weight.

When foamable compositions are used, viscosity is not the essential property, although it is wiser to keep it within reasonable limits. It is more important to concentrate on the maximum stretching which the material can withstand without breaking. In fact, the formation of gas bubbles causes substantial local stresses which would cause the bubbles to coalesce and the foam to sink if it were elongated beyond the maximum limit. Viscosity, like maximum stretching ability, increases with molecular weight. A simple increase thereof, with a regular distribution, would not, therefore, give a satisfactory situation.

The applicants have now found that the manufacture of styrene polymer foams is notably improved by adding to the basic polymers a relatively small amount of a resinous polymer, which is also a styrene polymer, having good compatability with the basic polymer and having a very high average molecular weight.

A first object of the present invention is therefore an improved process for the manufacture of styrene polymer foams permitting, under foam-forming conditions, an increase in the maximum elongation of the material without a notable increase in the viscosity thereof. A second object is a process providing foams which may have a very low bulk density, having a very fine, even, cellular structure and permitting higher output to be obtained than processes hitherto known. Still another object of the invention is a process providing foams having very advantageous subsequent behaviour characteristics: such as in the field of the manufacture of packaging material by thermoforming sheets of expanded polystryene. Said sheets have excellent thermoforming characteristics.

According to the invention, the ability of a styrene polymer A to expand is improved by incorporating therewith a relatively small amount of a resinous polymer B obtained by the polymerization of at least one styrene monomer or by the copolymerization of at least one such monomer with a comonomer containing a $CH_2=C<$ radical, the said resinous polymer having a molecular weight greater than $10^6$ and having satisfactory compatability with the basic polymer. The amount of additive B copolymer added, mixed with the starting material A, should be selected as a function of the nature of the starting material, the technique used, the bulk density of the expanded product and the molecular weight of said copolymer B. Generally speaking, satisfactory expansion of the starting material A is obtained when from 0.2 to 40 parts and preferably 1 to 30 parts by weight of addition polymer B, having a molecular weight greater than $10^6$, is mixed with 100 parts of said basic polymer A.

The process obviously necessitates the addition to the mixture of polymers A and B of an expansion agent or a pore-forming agent, and optionally the usual adjuvants necessary for the processing and suitable use of the finished articles obtained, such as, in a non-limiting manner, anti-oxidants, stabilizers, lubricants, agents for protection against radiation, antistatic agents, filler and reinforcing agents, coloring agents, etc.

The molecular weight of the thermoplastic polymers A and B is determined by the application of the Staudinger-Mark-Houwink equation $[\eta] = KM^\alpha$, wherein M is the average molecular weight, $[\eta]$ the intrinsic viscosity in a given solvent, such as butanone, $K$ and $\alpha$ are specific parameters of the polymer-solvent couple, generally provided by tables such as that in the Polymer Handbook published by Interscience Publishers. The compatibility which the two polymers A and B should possess for the invention to be put into effect under good conditions is a characteristic which has never been described in a completely satisfactory manner, although it is of considerable practical importance and it is well known to a man skilled in the art. Without going into details on the partial reciprocal miscibility of the polymers in question it is considered herein that two polymers are compatible if it is possible to mix them in such a way as to obtain a material having a mechanical behaviour similar to, or better than, that of the weaker of the two.

According to this definition, and as an example, a styrene acrylonitrile copolymer containing 70 parts of styrene and 30 parts of acrylonitrile is compatible with an ABS terpolymer obtained by grafting 30 parts of styrene and 15 parts of acrylonitrile on 55 parts of dispersed cross-linked polybutadiene in form of latex, whereas a styrene homopolymer and said ABS terpolymer are incompatible.

The expanding foaming agent used with an expandable composition according to the invention can be of any type; it can be a gas, an aliphatic hydrocarbon such as pentane, hexane, heptane etc., a chlorine or fluorine containing derivatives of an aliphatic hydrocarbon such as methylene chloride, chlorinated ethylene, or a chemical expanding agent which decomposes in response to the action of heat to provide a gas; chemical expanding agents such as azo compounds, hydrazides, amine nitrites, bicarbonates, oxalates, for example, are used. This list is not limitative, and the choice of a foaming agent depends on the characteristics desired in the expanded material, such as foodstuff purity, fireproof characteristics or the like, as well as on the process and temperature used. The foaming agent can either be previously incorporated in the basic polymer or in the added polymer, or in any other ingredient of the composition or added when the various ingredients are mixed or at the time when the mixture is used.

The basic styrene polymer (A) can be: (a) a homopolymer of styrene or of a styrene derivative substituted on the ring or in the alpha position such as chloro or dichlorostyrene, vinyl-toluene, α-methylstyrene, or a copolymer of styrene with such a styrene derivative, or further a copolymer of styrene and/or of such a styrene derivative, with one or more copolymerizable monomers such as acrylonitrile, methacrylonitrile, acrylic and methylacrylic acids and their alkyl esters, including methyl, ethyl and butyl esters; (b) a homopolymer or copolymer of the above listed types further including a small proportion of cross linking polyfunctional comonomers; (c) a mixture of polymers of type (a) and (b) hereinabove; (d) a mixture of one or more polymers of types (a) and (b) hereinabove with one or more elastomers adapted to increase impact strength such as polystyrene reinforced with a GRS type rubber or a graft product of styrene on a polybutadiene elastomer, styrene-acrylonitrile copolymer reinforced with a cross-linked acrylonitrile butadiene elastomer prepared in aqueous emulsion, or a graft product of acrylonitrile and styrene on a polybutadiene elastomer (ABS), or on a saturated acryl or polyolefin or ethylene-vinyl acetate type elastomer.

The added polymers (B) to be used in the process according to the invention are, as has been stated, resinous polymers obtained by polymerization of at least one styrene monomer or copolymerization of such a monomer with a comonomer containing a $CH_2=C<$ radical.

Examples of such added polymers (B) are polymers obtained by ionic or radical polymerization of vinyl aromatic hydrocarbons monomers (styrene, α-methylstyrene), a styreneacrylonitrile copolymers, polymers of the same type in which part of the styrene and/or part of or all the acrylonitrile are replaced by the corresponding substituted monomers, such as styrene-methacrylonitrile copolymers, or α-methylstyrene-styrene-acrylonitrile terpolymers, styrene and/or α-methylstyrene-methacrylate copolymers, styrene-acrylonitrile-methyl methacrylate terpolymers, and the like.

It may also be advantageous to add small amounts, less than 10% by weight based on the total monomers used, of other comonomers having, for instance, a cross-linking effect. Thus, for example, acrylonitrile-styrene copolymers containing less than 10% divinylbenzene can be used for this purpose.

The hereinabove described added polymers (B) can be prepared by any known polymerization method. However, the preferred method of preparation is aqueous emulsion polymerization. This process makes it easier to obtain high molecular weight products, the adjustment of said weight being obtained by the choice of polymerization temperature, the amount of initiator used, and possibly the chain transfer agent content.

Aqueous emulsion polymerization further enables added polymers to be obtained directly in the powder form, by simple atomization of latex for instance. Said powder form enhances satisfactory dispersion of the additive in the basic expandable composition. Indeed an advantageous method of incorporating the additive (B) into the basic thermoplastic material (A) consists in carrying out powder mixing in a rapid mixer. The foaming agents, such as nitrogen compounds, hydrazides, amine nitrites or simply bicarbonates or oxalates, and other additives such as stabilizers, antioxidants, lubricants, plasticizers, antistatic agents, nucleation agents, fireproofing agents, fillers and coloring agents may also be incorporated in the rapid mixer.

If the basic thermoplastic material (A) is obtained in emulsion, it may also be advantageous to admix it with the the added polymer in the form of a latex, thus permitting a very homogeneous mixture to be obtained.

Another method of obtaining a homogeneous mixture of the basic thermoplastic material and the added polymer consists in carrying out polymerization of one of said two components in the presence of the other.

The following may be cited as examples of particularly advantageous applications of the invention:

if the basic polymer (A) is a styrene homopolymer, possibly reinforced by an elastomer the added polymer (B) is advantageously a styrene homopolymer or a styrene-methyl methacrylate copolymer;

if the basic polymer (A) is a styrene-acrylonitrile copolymer, or an ABS terpolymer added polymer (B) is advantageously a styrene acrolonitrile-copolymer.

In other cases, and particularly in more complex cases which are becoming more and more frequent, where the basic polymer (A) consists of a resinous polymer containing numerous monomers: styrene or α-methylstyrene, acrylonitrile or methacrylonitrile, and methyl methacrylate and the like in various proportions, which may further be reinforced with a grafted or non-grafted elastomer, the choice of the added polymer (B) is guided by taking into account its probable compatibility with the resinous polymer of material (A) as well as by economic considerations.

This invention is illustrated by the following nonlimitative examples, in which the parts are parts by weight, unless otherwise stated.

EXAMPLE 1

Preparation of Very High Molecular Weight Polystyrenes (Hereinafter Designated as PS)

A reactor was charged with an emulsion having the following composition:

| | |
|---|---|
| Styrene | 100 parts |
| Water | 180 parts |
| Sodium tetrapropylbenzene sulfonate | 2 parts |
| Potassium persulfate | 0.075 part |
| Sodium bicarbonate | 0.5 part |

The mixture was heated while stirring at 70°C. during a period of 2 hours, then at 80°C. during a period of 30 minutes to complete the reaction.

After the resulting latex was dried, 98 parts of polystyrene were obtained having an intrinsic viscosity (I.V.) of 4.2 dl/g measured in butanone at 25°C. ($K = 19.5 \times 10^{-5}$, $\alpha = 0.635$), which corresponds to a molecular weight of about $7 \times 10^6$.

If 0.015 part of tetrapropylmercaptan is added to the above composition, the intrinsic viscosity of the polystyrene obtained is 2.7 dl/g, corresponding to a molecular mass of $3.2 \times 10^6$.

EXAMPLE 2

Preparation of Very High Molecular Weight Styrene - Acrylonitrile Copolymers Hereinafter Designated as SAN A reactor was charged with an emulsion having the following composition:

| | |
|---|---|
| Styrene | 72 parts |
| Acrylonitrile | 28 parts |
| Water | 180 parts |
| Sodium tetrapropylbenzene sulfonate | 2 parts |
| Potassium persulfate | 0.075 part |
| Sodium bicarbonate | 0.5 part |

Operating in the same manner as in Example 1, there was obtained 98 parts of a copolymer having an intrinsic viscosity (I.V.) of 10.3 dl/g measured in butanone at 30°C. ($k = 36 \times 10^{-5}$ $\alpha = 0.62$), corresponding to a molecular weight of about $14 \times 10^6$.

If 0.025 part of tetrapropylmercaptan is added to the above composition, the intrinsic viscosity of the copolymer obtained is 4 dl/g, corresponding to a molecular weight of about $3 \times 10^6$.

EXAMPLE 3

Preparation of Very High Molecular Weight Styrenemethyl Methacrylate Copolymers (Hereinafter Designated as S-MMA)

A reactor was charged with an emulsion having the following composition:

| | |
|---|---|
| Methylmethacrylate | 56 parts |
| Styrene | 44 parts |
| Water | 180 parts |
| Sodium tetrapropylbenzene sulfonate | 2 parts |
| Potassium persulfate | 0.075 parts |
| Sodium bicarbonate | 0.5 parts |

Operating in the same manner as in Example 1 98 parts of styrene-methylmethacrylate copolymer were obtained, having an intrinsic viscosity (I.V.) of 6.5 dl/g. in butanone at 25°C. ($K = 15.4 \times 10^{-5}$; $\alpha = 0.675$) which corresponds to an average molecular weight of $7.1 \times 10^6$.

If 0.025 part of tetrapropylmercaptan is added to the above composition, the intrinsic viscosity of the styrene-methylmethacrylate copolymer obtained is 3.1 dl/g. which corresponds to an average molecular weight of $2.3 \times 10^6$.

EXAMPLE 4

Preparation of Very High Molecular Weight Styreneacrylonitrile-Methylmethacrylate Copolymers (Hereinafter Designated as SAN-MNA)

A reactor was charged with an emulsion having the following composition.

| | |
|---|---|
| Styrene | 55 parts |
| Methylmethacrylate | 45 parts |
| Acrylonitrile | 45 parts |
| Water | 180 parts |
| Sodium tetrapropylbenzene sulfonate | 2 parts |
| Potassium persulfate | 0.075 part |
| Sodium bicarbonate | 0.5 part |

Operating in the same manner as in Example 1, 98, parts of styrene-acrylonitrile-methylmethacrylate copolymer were obtained, having an intrinsic viscosity (I.V.) of 8.9 dl/g. measured in butanone at 25°C.

If 0.030 part of tetrapropylmercaptan is added to the above composition, the intrinsic viscosity of the styrene-acrylonitrile-methylmethacrylate copolymer obtained is 4.3 dl/g.

For said copolymers the values $K$ and $\alpha$ are not known. However, permeable gel chromatography has shown that the average molecular weights thereof were above $2 \times 10^6$.

In the following examples, various styrene polymers and copolymers were used, which are commercial products marketed by Produits Chimiques Ugine-Kuhlmann, Paris, France. The average molecular weight of the basic polymer or copolymer resins in said products are as follows:

| Products | Average molecular weight |
|---|---|
| LORKACEL C 120 | 380,000 |
| LORKACEL C 124 | 280,000 |
| LORKACEL 11 | 250,000 |
| LORKACEL C 115 | 200,000 |
| LORKACEL JA | 180,000 |
| DIKARYL | 280,000 |
| LORKALENE 8 | 320,000 |

In accordance with a particular embodiment of the present invention as illustrated in the following examples, the thermoplastic material is extruded through a die in an unexpanded or, partially expanded state and the composition after leaving the die expands and thereafter solidifies. After leaving the die the composition passes into and through an elongated shaper or channel open at both ends preferably disposed coaxially with the die and having a substantially constant cross-section and an outlet cross-section equal to that required. The die is so formed as to produce a continuous cavity in the extruded composition immediately after extrusion thereof from the die such as by having the channel inlet circumscribing and being larger than the die outlet thereby forming a void in the plastic material in the shaper for expansion of the plastic material. Within the shaper, therefore, the plastic material expands tending to fill the void or the cavity. The cavity in the extruded product may be wholly or only partly filled with the expanded plastic composition depending upon how the extruder is operated, for example, by feeding the plastic composition through the die at controlled and varying rates and/or by withdrawing the extruded product from the shaper at controlled and different rates.

The inlet edge of the shaper is preferably in close proximity to the outlet edge of the die, at least along one corresponding portion of the shaper inlet and die outlet. The channel preferably has substantially the same cross-sectional size and shape along its full length. The die may be so formed, as by having therein a mandrel, to extrude the plastic material in the form of a tube whereupon the plastic material after leaving the die expands inwardly, that is, away from the internal walls of the shaper or channel, tending to fill the void in the center of the tube. The temperature of the extruded plastic material is above its melting point and below its decomposition temperature. The internal solid surface of the shaper has cooling means therein so that the extruded plastic material is rapidly cooled on its external surface to a temperature below its solidification temperature thereby to retard foaming of the extruded material on the external surface and to form a thick skin of higher density material thereby imparting sufficient mechanical strength to the extruded product in the shaper to permit it to be extruded in the shaper.

If desired, only a portion of the die outlet and the shaper inlet need be in close proximity and the remainder of the volume of the shaper may be allocated to the formation of the cavity or void in the extruded material in the channel for expansion of the plastic material. In such case the desired strength is imparted to the extruded material in the shaper by the formation of the dense and unexpanded skin on the portion which corresponds with such adjacent portions of die outlet and shaper inlet, the remainder of the external surface of the extruded material being free of such dense skin and relatively less smooth and dense.

EXAMPLES 5 to 10

Extrusion of Polystyrene Expanded Shaped Products

In order to obtain a cylindrical rod 32 mm in diameter in accordance with the process described in French Pat. No. 1,498,620, which enables expanded elongated products with a dense surface to be obtained, various expandable compositions were extruded comprising a polystyrene as basic polymer with or without addition of a very high molecular weight polystyrene obtained according to Example 1, and having an intrinsic viscosity of 4.2 dg./l. in butanone at 25°C.

The basic formulation of said compositions was the following:

Basic polystyrene } together 100 parts
added polystyrene
Sodium bicarbonate    5 parts
Stearic acid    10 0.1 part
Paraffin oil    0.025 part In the formulation of said mixtures, various relative proportions of basic polystyrene and very high molecular weight added polystyrene were used, the basic polystyrene being, in a first series of tests, a beaded, general purpose, expandable polystyrene sold under the trade name LORKACEL C 120, and, in a second series of tests, a high impact beaded expandable polystyrene sold under the trade name LORKACEL C 124.

The extrusion apparatus consisted of:
a powder fed ANDOUART extruder press 40 mm in diameter, 20 diameters in length, provided with a screw reference ANDOUART RB 30, a tubular die having an inner diameter of 31.8 mm and an axial mandrel in said die 27.2 mm in diameter.
a shaper 32.2 mm in diameter and 210 mm in length applied against the die and cooled by constant rate water circulation.
a cooling water-bath 2 m in length;
a drawing caterpillar with rubber soles.

The extrusion parameters were as follows:
Rotation speed of screw: 50 rpm.
Screw cooled by constant rate water circulation the outlet temperature of the water being 50°C.
Temperatures along the extruder press:
Body of the extruder from back to front: 110°–155°–170°–170°C.
Head: 130°C
Die: 120°C In the tests, the extrusion parameters being constant, the maximum speed of drawing of the extruder rod, selected in order to obtain a solid product, and the corresponding specific gravity were noted.

The results obtained according to the nature of the basic polystyrene and the relative proportion of said basic polystyrene and added polystyrene are reported in Table I below.

TABLE I

|  | 5 | 6 | 7 | 8 | 9 | 10 |
|---|---|---|---|---|---|---|
| LORKACEL C 120 beads (parts) | 100 | 90 | 80 | — | — | — |
| LORKACEL C 124 beads (parts) | — | — | — | 100 | 90 | 80 |
| PS additive IV = 4.2 dl/g (parts) | 0 | 10 | 20 | 0 | 10 | 20 |
| Maximum draw rate (cm/min) | 34 | 70 | 90 | 28 | 40 | 50 |
| Specific gravity of rod | 0.55 | 0.40 | 0.35 | 0.63 | 0.50 | 0.45 |
| Output (kg/h) | 9 | 13.5 | 15.2 | 8.5 | 9.7 | 10.9 |

The incorporation of a very high molecular weight polystyrene in a polystyrene or a high impact polystyrene therefore enables the expansion capacity to be improved: rods of lower specific gravity are obtained with increased hourly outputs.

EXAMPLES 11–14

Extrusion of Polystyrene Expanded Shaped Products

The same compositions as in Examples 5 to 10, with the only difference that the added polystyrene was replaced by the same amounts of S-MMA obtained according to Example 3 were extruded in the same conditions and according to the same series of tests as in said Examples 5 to 10.

The results obtained are given in Table II below, in which Examples 5 and 8 have been included for comparison purposes.

TABLE II

|  | 5 | 11 | 12 | 8 | 13 | 14 |
|---|---|---|---|---|---|---|
| LORKACEL C 120 beads (parts) | 100 | 90 | 80 | — | — | — |
| LORKACEL C 124 beads (parts) | — | — | — | 100 | 90 | 80 |
| S-MMA copolymer additive I.V. = 6.5 dl/g (parts) | 0 | 10 | 20 | 0 | 10 | 20 |
| Maximum draw rate (cm/min) | 34 | 61 | 70 | 28 | 36 | 43 |
| Specific gravity of rod | 0.55 | 0.39 | 0.34 | 0.63 | 0.51 | 0.46 |
| Output (kg/h) | 9 | 11.5 | 12.7 | 8.5 | 9.3 | 10.2 |

The incorporation of a very high molecular weight styrene-methylmethacrylate copolymer in a polystyrene or a high-impact polystyrene therefore enables the expansion capacity to be improved : rods of lower specific gravity are obtained.

EXAMPLES 15–17

Extrusion of ABS Expanded Shaped Products

Compositions 15, 16 and 17 comprising ABS (acrylonitrile-butadiene-styrene terpolymer) and as added polymer the SAN resin obtained according to Example 2 (I.V. = 4 dl/g) in butanone at 30°C, where extruded in the same apparatus as in Examples 5–10 and at the same temperatures, i.e.:
Body of the extrude: 110°–155°–170°–170°C
Head: 130°C
Die: 120°C.
The results obtained are given in Table III below:

TABLE III

| Examples Nos. | 15 | 16 | 17 |
|---|---|---|---|
| ABS powder LORKARIL JA (parts) | 100 | 95 | 90 |
| Added polymer:SAN powdered resin I.V. = 4 dl/g (parts) | 0 | 5 | 10 |
| Sodium bicarbonate | 3 | 3 | 3 |
| Maximum draw rate (cm/min) | 35 | 50 | 60 |
| Specific gravity of solid rod | 0.65 | 0.55 | 0.48 |
| Output kg/hour | 11 | 13.3 | 13.9 |

By incorporating a high molecular weight SAN resin, to ABS, foamed articles having a lower specific gravity may then be obtained, with a higher output.

EXAMPLES 18–21

Extrusion of ABS Expanded Shaped Products

Compositions comprising the ABS terpolymer used in Examples 17–19 and as added polymer, two SAN-MMA copolymers obtained according to Example 4 were extruded in the same apparatus and in the same conditions as in Examples 5–10.

The results obtained are given in Table IV below, in which Example 15 is included for purposes of comparison.

TABLE IV

| Examples Nos. | 15 | 18 | 19 | 20 | 21 |
|---|---|---|---|---|---|
| ABS powder LORKARIL JA (parts) | 100 | 90 | 80 | 90 | 80 |
| Added SAN-MMA copolymer I.V. = 8.9 dl/g (parts) | 0 | 10 | 20 | — | — |
| Added SAN-MMA copolymer I.V. = 4.3 dl/g (parts) | — | — | — | 10 | 20 |
| Sodium bicarbonate | 3 | 3 | 3 | 3 | 3 |
| Maximum draw rate (cm/min) | 35 | 55 | 70 | 49 | 62 |
| Specific gravity of rod | 0.65 | 0.50 | 0.39 | 0.56 | 0.45 |
| Output (kg/h) | 11 | 13 | 14.5 | 12.4 | 13.8 |

The incorporation of a very high molecular weight styrene-acrylonitrile-methylmethacrylate copolymer in an ABS terpolymer therefore enables the expansion capacity to be improved and it may be seen that in order to obtain a given degree of foaming the required composition of added styrene-acrylonitrile-methylmethacrylate copolymer is the lower, the higher the molecular weight of said copolymer.

EXAMPLES 22–39

Extrusion of Expanded Products with Free Expansion at the Die Outlet

The apparatus used was an ANDOUART extruder press 40 mm in diameter and 20 diameters in length, provided with a screw having a compression ratio of 2.5. The die had a circular cross-sectional outlet 9 mm in diameter. The product leaving the die was collected on a conveyor belt with no cooling means other than ambient air.

For the various expandable compositions described hereinbelow, the extrusion parameters were maintained constant at the following values:

Temperatures of the extruder body, from back to front: 110°–140°–160°–170°C.
Head temperature: 140°C
Die temperature: 120°C
Screw rotation rate: 20 rpm.

The material began to expand at the outlet of the die, rod was fed onto the conveyor belt without drawing and the diameter of said rod continued to increase on the belt.

At a distance of 70 cm from the die, the surface of the material having cooled sufficiently and the product having acquired its final shape, samples were taken and measured for:

bulk specific gravity, cross-section, which was compared with the cross-section of the die to assess the extent of expansion, or expansion ratio.

The general purpose expandable polystyrene, and high impact polystyrene compositions reported in Table V, below, containing 5 parts of sodium bicarbonate as foaming agent, were extruded in the above described apparatus and operating conditions, the added polymer being a polystyrene prepared according to Example 1 and having an intrinsic viscosity of 4.2 dl/g.

TABLE V

|  | 22 | 23 | 24 | 25 |
|---|---|---|---|---|
| Polystyrene (LORKACEL C 120) parts | 100 | 80 | — | — |
| High impact polystyrene (LORKACEL C 124) (parts) | — | — | 100 | 80 |
| Added P.S. I.V. = 4.2 dl/g (parts) | 0 | 20 | 0 | 20 |
| Bulk specific gravity | 0.30 | 0.15 | 0.36 | 0.22 |
| Expansion ratio | 12 | 24 | 8 | 15 |

The same polystyrene compositions as above, in which the added polystyrene polymer, was replaced by a styrene-methylmethacrylate copolymer (S-MMA) obtained according to Example 3 were extruded in the above described apparatus and operating conditions, the results obtained being reported in Table VI hereinafter in which Examples 22 and 24 have been included for purposes of comparison.

TABLE VI

| Examples Nos. | 22 | 26 | 24 | 27 |
|---|---|---|---|---|
| LORKACEL C 120 beads (parts) | 100 | 80 | — | — |
| LORKACEL C 124 beads (parts) | — | — | 100 | 80 |
| Added S-MMA copolymer I.V. = 3.1 dl/g (parts) | 0 | 20 | 0 | 20 |
| Bulk specific gravity | 0.30 | 0.16 | 0.36 | 0.20 |
| Expansion ratio | 12 | 23 | 8 | 16 |

Always using the same apparatus and conditions compositions were extruded comprising as basic polymer a styrene-acrylonitrile polymer (sold under the trade name DIKARYL) or an ABS terpolymer (LORKARIL JA), the added polymer being a styrene-acrylonitrile copolymer prepared as described in Example 2. The results are reported in Table VII below.

TABLE VII

| Example Nos. | 28 | 29 | 30 | 31 | 32 | 33 |
|---|---|---|---|---|---|---|
| Styrene-acrylonitrile copolymer (DIKARYL) (parts) | 100 | 90 | 80 | — | — | — |
| ABS terpolymer (LORKARIL JA) (parts) | — | — | — | 100 | 90 | 80 |
| Added SAN I.V. = 10.3 dl/g (parts) | — | 10 | 20 | — | 10 | 20 |
| Sodium bicarbonate (parts) | 5 | 5 | 5 | 5 | 5 | 5 |
| Bulk specific gravity | 0.52 | 0.25 | 0.10 | 0.60 | 0.35 | 0.21 |
| Expansion ratio | 5 | 21 | 26 | 4 | 17 | 25 |

Two other series of tests were performed using compositions comprising LORKARIL JA (ABS terpolymer) or DIKARYL styrene-acrylonitrile copolymer as basic polymer, the added polymer being a SAN-MMA copolymer obtained according to Example 4.

The results are reported in Table VIII below in which Examples 28 and 21 are repeated for purposes of comparison.

TABLE VIII

| Example Nos. | 28 | 34 | 35 | 21 | 36 | 37 |
|---|---|---|---|---|---|---|
| Styrene-acrylonitrile copolymer (DIKARYL) (parts) | 100 | 90 | 80 | — | — | — |
| ABS terpolymer LORKARIL JA (parts) | — | — | — | 100 | 90 | 80 |
| Added SAN I.V. = 10.3 dl/g (parts) | — | 10 | 20 | — | 10 | 20 |
| Sodium bicarbonate (parts) | 5 | 5 | 5 | 5 | 5 | 5 |
| Bulk specific gravity | 0.52 | 0.28 | 0.13 | 0.60 | 0.39 | 0.25 |
| Expansion ratio | 5 | 19 | 25 | 4 | 14 | 21 |

These expansion tests show clearly that the addition of a very high molecular weight polymer as defined hereinabove enables a homogeneous cellular structure to be formed, without fissures or pore coalescence and which attains its rigid properties more rapidly so that the foam does not shrink and the product attains its final external shape shortly after leaving the die.

EXAMPLES 38 and 39

To obtain a sheet of expanded polystrene 2.5 mm in thickness and of low density, an extrusion line was used consisting of:

an extruder press with a screw 90 mm in diameter and 36 × 90 mm in length; an orifice formed in the body of the screw type extruder and feed regulator pumps permitting the introduction, under pressure, of low boiling point liquids which will act as expansion agents;

a die with a circular cross-sectional outlet having an outer diameter of 170 mm and a thickness of 1.2 mm, a receiving system for the extruded sheath, consisting of swivelling flaps, pinching rollers, knives adapted to slit the sheath (inflated by blowing air into it) into two planar sheets, and winding-drums.

The following compositions were used in the extruded line:

|  | Example 38 | Example 39 |
|---|---|---|
| Standard polystyrene (Lorkalene 8) | 100 | 97 |
| PS additive VI: 4.2 dl/g | 0 | 3 |
| Sodium bicarbonate | 0.5 | 0.5 |
| Citric acid | 0.3 | 0.3 |
| Talcum | 0.4 | 0.4 |
| Lead stearate | 0.2 | 0.2 |

The screw rotation rate was fixed at 48 rpm, and the weight output at 87 KH/h.

Extrusion temperatures were controlled through the extruder press at the following values:

cylinder, from back to front: 175°–185°–200°–165°–130°C, head: 130°–125°C.

6 parts (for 100 parts by weight of polystyrene) of an 80/20 mixture of dichlorodifluoromethane and trichlorofluoromethane (Forane 12 and Forane 11) are introduced into the body of the extruder by means of feed regulator pumps.

Extrusion of the mixture of Example 38 provided a puckered sheath resulting in the obtainment of a sheet of uneven thickness having an average density of 0.18 g/cm³.

On the other hand, extrusion of the mixture of Example 39, comprising the high molecular weight additive, enabled a perfectly stretched and circular blown sheath to be obtained. Perfectly even thickness sheets having an average density of 0.15 g/cm³ were thus obtained in Example 39.

During thermoforming of sheets to manufacture egg containers, sheets manufactured according to Example 39 had better behaviour characteristics: the thickness of the containers obtained was much more even, with no tearing zone. They had a better surface appearance and greater resistance in crushing.

EXAMPLES 40–45

Injection of Polystyrene and High Impact polystyrene

Shoe heels having a volume of 98 cu.cm were injected using a 135 g capacity SMAL press equipped with a screw having a compression ratio of 2.5.

The advantage of using the added polymer was shown by two series of injection tests:

a. the amount of expandable material fed into the mould was varied so as to obtain maximum lightness, the following injection parameters being maintained constant:

temperature at the inlet of the press: 120°C
temperature in the middle of the press: 170°C
temperature of the nozzle: 190°C
duration of the cycle: 250 seconds (230 seconds for mould cooling, 10 seconds for injection and 10 seconds for extraction).

b. the specific gravity of the heel injected was fixed, and the minimum duration of mould cooling determined so as to be sufficient for the article to retain its shape after extraction. The other injection parameters were maintened at the values given here above.

General purpose expandable polystyrene sold under the trade name LORKACEL 11 and high impact expandable polystyrene sold under the trade name LORKACEL C 115 were used in different tests with or without an added polymer, or copolymer, i.e. a PS polymer or a S-MMA copolymer obtained according to Examples 1 and 3, respectively. In each case, 3 parts of sodium bicarbonate were used as foaming agent.

The results of said tests were reported in table IX hereunder.

TABLE IX

| EXAMPLES Nos | 40 | 41 | 42 | 43 | 44 | 45 |
|---|---|---|---|---|---|---|
| Expandable polystyrene LORKACEL 11 (parts) | 100 | 85 | 85 | — | — | — |
| High impact expandable polystyrene LORKACEL C 115 (parts) | — | — | — | 100 | 85 | 85 |
| Added PS polymer I.V. = 2.7 dl/g (parts) | — | 15 | — | — | 15 | — |
| Added S-MMA copolymer I.V. = 3.1 dl/g (parts) | — | — | 15 | — | — | 15 |
| Minimum specific gravity obtained | 0.45 | 0.36 | 0.33 | 0.55 | 0.45 | 0.39 |
| Minimum cooling time for a specific gravity of 0.45 (seconds) | 180 | 150 | 170 | 210 | 180 | 200 |

EXAMPLES 46–50

Expansion Injection of ABS Terpolymer Compositions

Using the same apparatus and adjustments as in examples 40 to 45 the same tests were carried out with expandable compositions comprising an ABS terpolymer (LORKARYL JA), and added polymer, either a SAN copolymer obtained according to Example 2 or a SAN-MMA copolymer obtained according to Example 4. The compositions used and results obtained are summarized in table X.

TABLE X

| EXAMPLES Nos | 46 | 47 | 48 | 49 | 50 |
|---|---|---|---|---|---|
| LORKARIL JA (parts) | 100 | 90 | 85 | 90 | 85 |
| SAN copolymer I.V. = 4 dl/g (parts) | — | 10 | 15 | — | — |
| SAN-MMA copolymer I.V. = 4.3 dl/g (parts) | — | — | — | 10 | 15 |
| Sodium bicarbonate parts | 5 | 5 | 5 | 5 | 5 |
| Minimum specific gravity obtained | 0.60 | 0.55 | 0.52 | 0.50 | 0.46 |
| Minimum cooling time for a density of 0.60 (seconds) | 220 | 200 | 190 | 210 | 200 |

Examples 40 to 50 show that, as in the case with extrusion, incorporation of an added polymer according to the present invention into an expandable composition for injection moulding enables injected articles having a lower specific gravity to be obtained.

Furthermore, for the same specific gravity the time required for cooling the mould before extraction can be decreased, thus permitting increased productivity.

A further advantage resulting from the incorporation of added, very high molecular weight polymers according to the invention consists in the improvement of the surface condition of the expanded articles obtained by injection moulding of such compositions. The surface of said articles is smoother, much less porous, and therefore less permeable, which is very important when the injection-moulded articles are intended to receive a final coating of varnish, paint, lacquer, or the like.

The following example illustrates this advantage.

EXAMPLE 51

Rectangular plates 170 × 70 × 10 mm, were injection moulded by means of an ARBURG, ALLROUNDER 300 injection screw press, the injected composition being, in a first series, high impact, expandable polystyrene LORKACEL C 115 alone, and in a second series, the same polystyrene added with 10% parts by weight of a high molecular weight polystyrene, having an intrinsic viscosity of 2.7 dl/g. The conditions of injection were selected in order to obtain plates having a bulk specific gravity of 0.6.

With the second above mentioned composition, the surface of the plates obtained was, as appeared to the eye and feeling, distinctly smoother than that of the plates obtained with pure LORKACEL C 115.

In order to evaluate this improvement use was made of an apparatus comprising a cathode ray oscilloscope receiving signals from a piezo electric pick up head provided with a diamond needle said head being applied with a force of 10 g. on the surface of the inspected plate while said plate, carried by a carriage moves at a speed of 2 cm. per sec. The oscillations indicated by the CRO and produced by the micro-asperities on the surface of the plate are photographed by means of a POLAROID D 12 Tectronix camera.

The photographs obtained when thus scanning the two types of plates obtained as above mentioned show that the average amplitude of the oscillations corresponding to the plates injection-moulded with LORKACEL C 115 alone is twice that of the plates injected with the mixture of 90 parts of LORKACEL C 115 and 10 parts of high molecular weight polystyrene.

Although a certain number of embodiments of the invention have been described hereinabove, numerous modifications there to can be contemplated by anyone skilled in the art without departing from the scope of the following claims.

The compounds LORKACEL, LORKARIL; DIKARYL mentioned in the above examples are manufactured and sold by UGINE-KUHLMANN, PARIS, France.

Although a certain number of embodiments of the invention have been described hereinabove, numerous modifications thereto can be contemplated by anyone skilled in the art without departing from the scope of the following claims.

We claim:

1. A process for improving the foamability of a thermoplastic styrene polymer comprising adding to a conventional thermoplastic styrene polymer (A) a high molecular weight resinous thermoplastic styrene polymer (B) selected from the group consisting of polymers of nonsubstituted or substituted styrene monomers and copolymers of said styrene monomer with a comonomer containing a $CH_2 = C <$ radical, said resinous polymer (B) being compatible with the thermoplastic styrene polymer (A), having an average molecular weight equal to or greater than $10^6$ as determined by the Standinger-Mark-Houwink equation, and a foaming agent, and wherein said resinous styrene polymer (B) is present in a proportion of 1 to 40 parts by weight per 100 parts of conventional polymer (A).

2. A process as claimed in claim 1 wherein the polymer (A) is polystyrene.

3. A process as claimed in claim 2 wherein the polymer (B) is polystyrene.

4. A process as claimed in claim 2 wherein the polymer (B) is a styrene-methyl methacrylate copolymer.

5. A process as claimed in claim 1 wherein the polymer (A) is high impact polystyrene.

6. A process as claimed in claim 5 wherein the polymer (B) is polystyrene.

7. A process as claimed in claim 5 wherein the polymer (B) is a styrene-methyl methacrylate copolymer.

8. A process as claimed in claim 1 wherein the polymer (A) is an acrylonitrile butadiene-styrene copolymer.

9. A process as claimed in claim 8 wherein the polymer (B) is a styrene-acrylonitrile copolymer.

10. A process as claimed in claim 8 wherein the polymer (B) is a styrene-acrylonitrile-methyl methacrylate copolymer.

11. A process as claimed in claim 1 wherein the polymer (A) is a styrene-acrylonitrile copolymer.

12. A process as claimed in claim 11 wherein the polymer (B) is a styrene-acrylonitrile copolymer.

13. A process as claimed in claim 11 wherein the polymer (B) is a styrene-acrylonitrile-methyl methacrylate copolymer.

14. A method for the production of an extruded product from a foamable plastic composition, said composition comprising a styrene polymer consisting essentially of a conventional thermoplastic styrene polymer (A) to which is added a resinous thermoplastic styrene polymer (B) selected from the group consisting of polymers of non-substituted or substituted styrene monomers and copolymers of said styrene monomer with a co-monomer containing a $CH_2 = C <$ radical, said resinous polymer (B) being compatible with the thermoplastic styrene polymer (A), having an average molecular weight equal to or greater than $10^6$ as determined by the Standinger-Mark-Houwink equation and wherein said resinous styrene polymer (B) is present in a proportion of 1 to 40 parts by weight per 100 parts of conventional polymer (A) and a foaming agent, comprising extruding through a die said expandable composition in an unexpanded or partially expanded state, permitting said composition after leaving said die to foam and solidify and recovering the extruded product.

15. A foamable thermoplastic styrene polymer composition having improved foaming characteristics, consisting essentially of a conventional thermoplastic styrene polymer (A) to which is added a resinous thermoplastic styrene polymer (B), selected from the group consisting of polymers of non-substituted and substituted styrene monomers and copolymers of said styrene monomers with a comonomer containing a $CH_2 = C <$ radical, said resinous polymer (B) being compatible with the conventional styrene polymer (A), having an average molecular weight equal to or greater than $10^6$ as determined by the Standinger-Mark-Houwink equation, and a foaming agent and wherein said resinous styrene polymer (B) is present in a proportion of 1 to 40 parts by weight per 100 parts of basic polymer (A).

16. A composition as claimed in claim 15 wherein the polymer (A) is polystyrene.

17. A composition as claimed in claim 16 wherein the polymer (B) is polystyrene.

18. A composition as claimed in claim 16 wherein the polymer (B) is a styrene-methyl methacrylate copolymer.

19. A composition as claimed in claim 15 wherein the polymer (A) is high impact polystyrene.

20. A composition as claimed in claim 19 wherein the polymer (B) is polystyrene.

21. A composition as claimed in claim 19 wherein the polymer (B) is a styrene-methyl methacrylate copolymer.

22. A composition as claimed in claim 15 wherein the polymer (A) is an acrylonitrile-butadiene-styrene copolymer.

23. A composition as claimed in claim 22 wherein the polymer (B) is a styrene-acrylonitrile copolymer.

24. A composition as claimed in claim 22 wherein the polymer (B) is a styrene-acrylonitrile-methyl methacrylate copolymer.

25. A composition as claimed in claim 25 wherein the polymer (B) is a styrene-acrylonitrile copolymer.

26. A composition as claimed in claim 15 wherein the polymer (B) is a styrene-acrylonitrile-methyl methacrylate copolymer.

* * * * *

UNITED STATES PATENT AND TRADEMARK OFFICE
CERTIFICATE OF CORRECTION

PATENT NO. : 3,903,023
DATED : September 2, 1975
INVENTOR(S) : Pierre Emile Boutillier et al.

It is certified that error appears in the above-identified patent and that said Letters Patent are hereby corrected as shown below:

Column 3, penultimate line, "commonomer" should read -- comonomer --;

Column 4, line 4, delete "a";

Column 4, line 41, "the" should read -- this --;

Column 4, line 44, "the the" should read -- the --;

Column 5, line 50, "k" should be -- K --;

Column 6, line 21, "SAN-MNA" should read -- SAN-MMA --;

Column 6, line 34, after "98" delete the comma;

Column 8, line 6, "10 0.1 part" should read -- 0.1 part --;

Column 9, line 44, "where" should read -- were --;

Column 9, line 47, "extrude:" should read -- extruder: --;

Column 12, last two lines, "the extruded" should read -- this extruder --;

Column 13, line 41, "polystyrene" (2nd occurrence) should read -- polystyrene expandable compositions --;

Column 15, lines 41-45, delete entire paragraph which duplicates the paragraph appearing at Column 15, lines 51-55; and Column 18, line 9, "claim 25" should read -- claim 15 --.

Signed and Sealed this fifteenth Day of June 1976

[SEAL]

Attest:

RUTH C. MASON
Attesting Officer

C. MARSHALL DANN
Commissioner of Patents and Trademarks